United States Patent [19]

Komoto et al.

[11] Patent Number: 4,457,608
[45] Date of Patent: Jul. 3, 1984

[54] INTERCHANGEABLE LENS WITH ELECTRICAL CONTACTS FOR TRANSMITTING DATA TO A CAMERA

[75] Inventors: Shinzuke Komoto; Yasuyuki Haneishi, both of Tokyo, Japan

[73] Assignee: Asahi Kogaki Kogyo Kabushiki Kaisha, Tokyo, Japan

[21] Appl. No.: 375,599

[22] Filed: May 6, 1982

[30] Foreign Application Priority Data

May 12, 1981 [JP] Japan ............................. 56-68211[U]

[51] Int. Cl.³ .......................................... G03B 17/00
[52] U.S. Cl. ................................................. 354/286
[58] Field of Search ........................ 354/46, 286, 271; 350/252, 257; 352/142, 231

[56] References Cited

U.S. PATENT DOCUMENTS 4,357,089 11/1982 Okura et al. ...................... 354/286

Primary Examiner—John Gonzales
Attorney, Agent, or Firm—Sughrue, Mion, Zinn, Macpeak and Seas

[57] ABSTRACT

An interchangeable lens is provided with a plurality of contacts arranged in recesses and engaged with one side of a lever actuated when the lens is mounted to a camera. Upon mounting, the contacts protrude beyond the end of the lens into recesses in the camera body to make contact with a further set of electrical contacts arranged therein.

2 Claims, 4 Drawing Figures

FIG. 1
FIG. 2
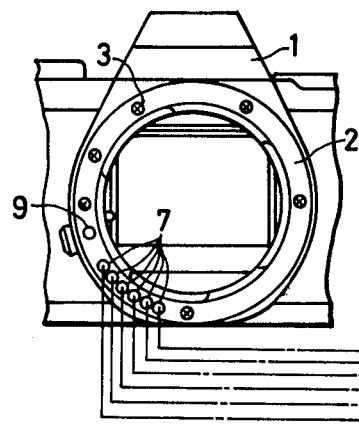
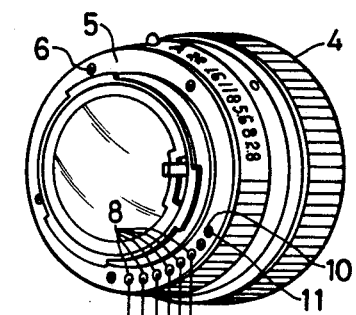
FIG. 3
FIG. 4
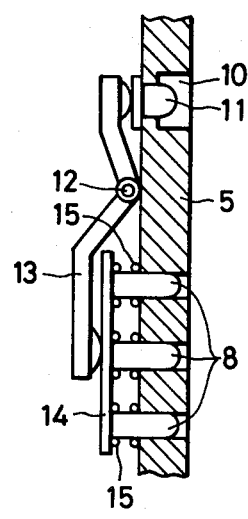
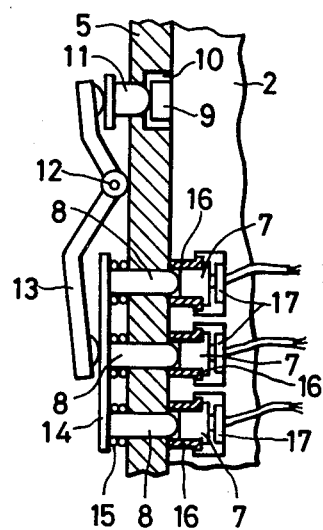

INTERCHANGEABLE LENS WITH ELECTRICAL CONTACTS FOR TRANSMITTING DATA TO A CAMERA

BACKGROUND OF THE INVENTION

This invention relates to an improvement in an interchangeable lens having electrical contacts through which information is transmitted to the camera body.

In general, in order to perform automatic exposure control, and to indicate the shutter speed and the aperture value according to the automatic exposure control, information or data on the lens such as the full-aperture value or minimum aperture value of an interchangeable lens must be transmitted to the camera body when the interchangeable lens is mounted on the camera body.

For this purpose, i.e., in order to transmit lens data as electrical signals to the camera body, a method has been proposed in the art in which electrical contacts are provided on the mounts of the camera body and the photographing lens in a manner such that the electrical contacts protrude somewhat from the srufaces of the mounts. When the interchangeable lens is mounted, the circuits are completed, whereby the inherent aperture data or the like of the interchangeable lens are transmitted to a control circuit or the like on the camera body side.

However, this method is disadvantageous in the following point: As the electrical contacts protrude, in mounting the interchangeable lens, the electrical contacts on the camera side and the electrical contacts on the lens side may rub against one another, as a result of which electric power is uneconomically consumed, the control indication and calculation may include errors, and the lens cannot be mounted smoothly.

SUMMARY OF THE INVENTION

An object of this invention is to solve the above-described problems, i.e., to prevent the erroneous transmission of the inherent aperture data or the like in mounting an interchangeable lens. More specifically, an object of the invention is to provide an interchangeable lens in which, when the lens is mounted on the mount of a camera body so that a lock pin on the mount of the camera body is inserted into a lock groove in a lens mount, electrical contacts on the lens mount are made to protrude from the mount surface so as to be connected to electrical contacts on the camera mount, whereby the inherent aperture data or the like of the interchangeable lens are transmitted to the camera body side.

BRIEF DESCRIPTION OF THE DRAWINGS

The invention will be described with reference to its preferred embodiment shown in the accompanying drawings, in which:

FIG. 1 is a front view showing a portion of a camera body;

FIG. 2 is a perspective view of an interchangeable lens which is to be mounted on the camera of FIG. 1;

FIG. 3 is a sectional view showing a lens mount before being mounted on the camera; and FIG. 4 is a sectional view showing the lens mount and the camera mount engaged with one another.

DETAILED DESCRIPTION OF THE PREFERRED EMBODIMENTS

FIG. 1 is a front view showing a part of a camera body 1. An electrically conductive mount 2 is secured to the camera body 1 with screws 3, and is connected to a branch line of a control circuit which is provided on the side of the camera.

FIG. 2 is a perspective view of an interchangeable lens 4 which is mounted on the camera mount shown in FIG. 1. Similarly as in the case of the camera body 1, an electrically conductive lens mount 5 is secured to the interchangeable lens 4 with screws 6.

Electrical contact pins 7 and 8 are provided on the mounts 2 and 5, respectively, in such a manner that they may be electrically connected to one another. These electrical contact pins are for transmitting to the camera body side, data indicative of inherent aperture values (such as a wide-open aperture value and a minimum aperture value) of each interchangeable lens, i.e., electrical data such as resistances, etc. According to the characteristics (such as the wide-open aperture value and the minimum aperture value) of each interchangeable lens, the positions of the embedded electrical contact pins 8 of the interchangeable lens are changed, or electrically conductive and/or electrically non-conductive contact pins are suitably arranged to indicate the characteristics of the interchangeable lens, i.e., to transmit the inherent aperture values or the like of the lens to the camera body side.

The interchangeable lens 4 shown in FIG. 2 is mounted on the camera body 1 through bayonet engagement in a conventional manner as is apparent from FIGS. 1 and 2. When the interchangeable lens has been completely turned, a lock pin 9, which is urged to protrude from the camera mount 2, is engaged with a lock groove 10 formed in the lens mount 5, so that the aforementioned electrical contact pins 7 and 8 are electrically connected to one another.

According to the invention, the mounts and the electrical contact points arranged thereon are designed as shown in FIGS. 3 and 4.

FIG. 3 is a sectional view of the lens mount before mounting to the camera mount 2. A push pin 11 provided in the lock groove 10 of the lens mount 5 is so designed that it normally protrudes from the lock groove surface due to springs 15 described later, and, when the interchangeable lens 4 is mounted on the camera body 1 so that the lock pin 9 on the mount 2 of the camera body 1 is inserted into the lock groove, the push pin 11 is pushed towards the lens. The aforementioned electrical contact pins 8 are integral with a substrate 14. The springs 15 are elastically provided between the substrate 14 and the lens mount 5, so that the electrical contact pins 8 on the substrate 14 are normally maintained extracted from the lens mount surface by the elastic force of the springs 15.

A see-saw lever 13 is pivotally mounted on a shaft 12 on the inner surface of the lens mount 5. One end portion of the see-saw lever 13 is in contact with one end of the push pin 11, while the other end portion of the see-saw lever 13 is in contact with the substrate 14. Therefore, when the interchangeable lens 4 is not mounted on the camera body 1, the elastic force of the springs is exerted on the substrate 14 and transmitted to the push pin 11, so that the push pin 11 protrudes. When the interchangeable lens 4 is mounted on the camera body 1, the force exerted on the push pin 11 is transmitted to the substrate 14, so that the electrical contact pins 8 protrude from the lens mount 5 against the force of the springs 15 so as to be connected to the electrical contact pins 7 on the camera mount.

FIG. 4 is a sectional view showing the lens mount and the camera mount engaged with one another. The push pin 11 is pushed towards the lens by the lock pin 9, so that the see-saw lever 13 is turned about the shaft 12. That is, the other end portion of the see-saw lever 13 pushes the substrate 14 towards the mount against the force of the springs 15, so that the electrical contact pins 8 on the substrate 14 protrude from the lens mount 5 so as to be connected to the electrical contact pins 7 on the camera mount 2, such that the inherent aperture data, etc. on the lens side are transmitted to the camera body side.

Some of the electrical contact pins 8, which should not be electrically conductive because of the characteristics of the particular lens barrel, may be made of electrically non-conductive material, or may be eliminated.

Each of the electrical contact pins 7 on the camera mount 2 is electrically insulated from the camera mount 2 by a collar 16 as shown in FIG. 4. One end of each electrical contact pin 7 is in contact with a connecting plate 17 which is connected to one branch line of an exposure control circuit (not shown) or the like provided on the camera side, and the contact pin 7 is maintained extracted from the surface of the camera mount 2.

Therefore, when the electrical contact pins are electrically connected with one another, by means of the electrical contact pins 8 made of electrically conductive material, a branch line of a circuit connected to the camera mount 2 is connected to a branch line of a circuit connected to the electrical contact pin of the camera mount 2, through the camera mount 2, the lens mount 5, the electrical contact pin 8 of the lens mount and the electrical contact pin 7 of the camera mount, whereby the inherent aperture values or the like on the lens side are transmitted to the exposure control circuit or the like on the camera side.

When the lens barrel is mounted on the mount of the camera body so that the lock pin on the mount of the camera body is inserted into the lock groove formed in the lens mount, the electrical contact pins are protruded from the lens mount so as to be brought into contact with the electrical contact pins on the camera mount, whereby the inherent aperture values or the like on the lens side are transmitted to the camera body side. Accordingly, in mounting the lens, the electrical contact pins will never abut one another. Therefore, the difficulties mentioned above with respect to the consumption of electric power, and control indication and calculation errors are eliminated according to the invention. Thus, the effects of the invention should be highly appreciated in practical use.

What is claimed is:

1. An assembly for mounting an interchangeable lens to a camera body comprising:
    a lens mount;
    a camera body mount;
    a plurality of electrical contacts normally received within recesses provided in said lens mount;
    a plurality of electrical contacts received within recesses provided in said camera body mount;
    means for protruding said contacts from said lens mount when said lens is mounted to said camera body, said protruding means further comprising a lever means in said lens, one end of said lever means being engaged with ends of said lens contacts and the other end of said lever means having a protrusion;
    a plate disposed between said lens contacts and said lever means; and
    a plurality of springs biasing said lens contacts away from said camera body;
    said lens mount including a lock groove into which said protrusion protrudes, said camera mount including a pin engageable with said protrusion, whereby said lever is pivoted to urge said lens contacts out of said recesses to engage said camera body contacts.

2. An assembly as claimed in claim 1, wherein said camera body contacts are connected to lead wires, and are selectively electrically connected to one another by means of said lens contacts.

* * * * *